United States Patent [19]

Colleu et al.

[11] Patent Number: 5,415,031

[45] Date of Patent: May 16, 1995

[54] PROCESS AND DEVICE FOR ESTIMATING THE ALTITUDE OF AN AIRCRAFT INCLUDING AN INERTIAL REFERENCE SYSTEM, RADIO ALTIMETERS AND A POLLER

[75] Inventors: Rachel Colleu; Pierre Fougere, both of Colomiers, France

[73] Assignee: Aerospatiale Societe Nationale Industrielle, Paris, France

[21] Appl. No.: 141,596

[22] Filed: Oct. 27, 1993

[30] Foreign Application Priority Data

Nov. 2, 1992 [FR] France ................. 92 13101

[51] Int. Cl.$^6$ ............................. G01C 21/16
[52] U.S. Cl. ....................... 73/178 R; 73/178 T; 340/977; 364/433
[58] Field of Search ............ 73/384, 386, 387, 178 R, 73/178 T; 364/433, 434; 340/970, 977

[56] References Cited

U.S. PATENT DOCUMENTS 3,296,422  1/1967  Rusler ................. 364/433
5,136,512  8/1992  Le Borne ............. 364/461
5,233,542  8/1993  Höhner et al. ....... 364/433 X

OTHER PUBLICATIONS

Clark et al., IEEE Trans. on Aero. and Elect. Systems, vol. AES12, (Jul. 4, 1976), pp. 459–463.

Primary Examiner—Richard E. Chilcot, Jr.
Assistant Examiner—Joseph L. Felber
Attorney, Agent, or Firm—Fisher, Christen & Sabol

[57] ABSTRACT

The invention is a process and a device for determining an estimation of the altitude of an aircraft from at least two independent measurements of the altitude, by polling. The aircraft must include at least one inertial reference system. A signal representing a first or second derivative of the altitude is diverted from the inertial reference system, polling is undertaken on the magnitudes of like order deduced from the independent altitude measurements and from the derivative of the altitude, respectively, and an integration operation is undertaken so as to obtain the altitude estimation.

9 Claims, 4 Drawing Sheets

PROCESS AND DEVICE FOR ESTIMATING THE ALTITUDE OF AN AIRCRAFT INCLUDING AN INERTIAL REFERENCE SYSTEM, RADIO ALTIMETERS AND A POLLER

FIELD OF THE INVENTION

The present invention relates to a process and a device for estimating the altitude of an aircraft. The present invention is more suitable for use near the ground, particularly in an automatic airplane landing system. However it is not exclusively for use near the ground.

BACKGROUND OF THE INVENTION

It is known that an automatic landing system of this kind is aimed at controlling the descent path of an airplane so as to make the latter touch down on a runway and, more especially, inside an area of the runway called the little runway.

Such control is carried out using ILS-type radio navigation signals (glide and lock), picked up by radio or radio navigation measurement probes on board the airplane.

It is known that the path followed by an airplane while landing includes two phases, namely a first phase of descent on a fictitious axis of the runway (during which the airplane is guided longitudinally and transversely by ILS radio navigation signals) and a second so-called flare phase (during which the airplane is made to describe a curved path linking up with the runway, so as to reduce the velocity of impact of the airplane on the runway). This makes it possible to improve landing comfort and to avoid any damage to the structure of the airplane, especially to its landing gear.

It thus seems natural to control this path by knowing the height of the wheels of the landing gear of the airplane with respect to the ground.

A simple geometrical correction enables this height to be determined from the distance separating the altimetric probes from the lower part of the wheels of the airplane.

Several devices for estimating the altitude of an aircraft, in particular with a view to controlling its landing path, are already known for this purpose.

For example, BOEING airplanes include a device of this kind comprising three radio altimeters whose outputs are connected respectively to the inputs of a poller, the output of this poller delivering a signal representing the estimation of the altitude. In such a device, when the three radio altimeters are working properly, the three altitude measurements are very close to one another and, when fault-free, the polled measurement differs very little from each of the three measurements of the radio altimeters.

In the event that one of the radio altimeters is faulty, it delivers an incorrect measurement. By contrast, when free of any other fault, the measurements arising from the other two radio altimeters are virtually identical, and the polled measurement is, thus virtually identical to these latter two measurements.

The known device described above does not therefore notice the first fault of a radio altimeter, and it is said to be "passive". That is to say it exhibits good transparency in relation to a fault in any one of the radio altimeters.

However, this known device has a significant disadvantage, since it requires three independent measurement chains.

In order to remedy this disadvantage, other devices have been proposed, such as those equipping the AIRBUS airplanes.

These devices include two radio altimeters, one of which is the main and the other of which is the standby radio altimeter.

A switch makes it possible to connect up to the output of the standby radio altimeter, in the event of a recognized fault in the main radio altimeter.

Such a device has the advantage of requiring just two radio altimeters.

However, it has a number of disadvantages. It is passive in respect of a fault only after recognition of the fault and switching over to the other radio altimeter. Moreover, if the standby radio altimeter is also defective, the ability to land on automatic is lost.

In order to try to remedy these disadvantages, it has been proposed to apply the output from one or the other of the radio altimeters to the terminals of the switch across auxiliary switches.

However, this solution also requires knowledge of the faults.

SUMMARY OF THE INVENTION

Objects of the present invention are to resolve the various difficulties mentioned above and to produce an altitude estimation device for an aircraft which is both simple and extremely reliable and has, the advantages of the state of the art devices namely:
  reduction of the number of radio altimeters while exhibiting passivity which is equal to or greater than that of the already known devices, with a higher number of radio altimeters;
  improvement of the filtering of the information output by the radio altimeters, thus making it possible to improve the automatic landing performance; and
  lowering of the decision height thresholds, in the event, in particular, of a defect in a radio altimeter by virtue of the better passivity to faults.

For this purpose, according to the invention, the process for determining, by polling, an estimation of the altitude of an aircraft from at least two independent measurements of said altitude, said aircraft including at least one inertial reference system, is notable in that there is diverted from said inertial reference system a signal representing a derivative of said altitude, in that polling is undertaken on the magnitudes of like order deduced, respectively, from said independent altitude measurements and from said derivative of the altitude and in that an integration operation is undertaken in order to obtain said altitude estimation.

Thus, by virtue of the present invention, a radio altimeter measurement chain can be replaced by employing an inertial magnitude which is available for other uses on board any aircraft possessing at least one inertial reference system.

The signal diverted from said inertial reference system may represent the vertical velocity of the aircraft, that is, the derivative of first order of said altitude, or else the vertical acceleration of the aircraft, that is to say the derivative of second order of said altitude.

In the first case, before polling, a first order integration operation may be undertaken on said vertical velocity of the aircraft so as to obtain a magnitude homogeneous with an altitude and said polling may be undertaken, on the one hand, on said magnitude deduced from integrating said vertical velocity and, on the other hand, on the magnitudes deduced directly, without modifications, from said independent measurements. As a variant and preferably, before polling, a first order differentiation operation is undertaken on said independent measurements of altitude so as to obtain magnitudes homogeneous with velocities, polling is undertaken, on the one hand, on said magnitudes deduced by differentiating said independent altitude measurements and, on the other hand, on the magnitude deduced directly, without modifications, from said vertical velocity of the aircraft and, after polling, a first order integration operation is undertaken.

When using the vertical acceleration signal delivered by the inertial reference system, it is possible to undertake, before polling, second order integration of said vertical acceleration of the aircraft so as to obtain a magnitude homogeneous with an altitude and to undertake said polling, on the one hand, on said magnitude deduced from the second order integration of said vertical acceleration and, on the other hand, on the magnitudes deduced directly, without modifications, from said independent measurements. As a variant, it is also possible to undertake, before polling, a first order differentiation operation on said independent altitude measurements so as to obtain magnitudes homogeneous with velocities, to undertake, likewise before polling, a first integration of first order on said vertical acceleration of the aircraft so as to obtain a magnitude likewise homogeneous with a velocity, to undertake said polling on said magnitudes homogeneous with velocities deduced, respectively, from said independent altitude measurements and from said vertical acceleration, and, after polling, to undertake a second integration of first order on said polled magnitude.

However, for reasons given below, it is preferable to undertake, before polling, a second order differentiation operation on said independent altitude measurements so as to obtain magnitudes homogeneous with accelerations, to undertake polling, on the one hand, on said magnitudes deduced by differentiating said independent altitude measurements and, on the other hand, on the magnitude deduced directly, without modifications, from said vertical acceleration of the aircraft and, after polling, to undertake a second order integration operation.

Regardless of the magnitude (vertical velocity or vertical acceleration) directed from the inertial reference system, it is advantageous for there of be more than one inertial reference system and for the signal, representing a derivative of said altitude and diverted from said inertial reference system, to result from the polling of a plurality of signals of similar nature. Thus, safety as regards the signal delivered by the inertial reference system is increased.

A preferred embodiment of a device, according to the invention, for the estimation of the altitude of an aircraft including an inertial reference system, said device being carried on board said aircraft and including at least two radio altimeters each delivering a measurement of the altitude of said aircraft, as well as a poller with at least three inputs, is notable in that:

one of the inputs of said poller is connected to the output of said inertial reference system delivering said signal representing a derivative of the altitude;

the other inputs of said poller are connected respectively to the outputs of said radio altimeters delivering said altitude measurements, through differentiation means delivering the derivative of said altitude measurements, these latter derivatives being of the same order as said altitude derivative represented by said signal originating from said inertial reference system; and the output of said poller is connected to integration means integrating the polled signal appearing at the output of said poller, so that the output of said integration means deliver an estimated altitude signal.

In the device of the invention, the signal delivered by said inertial reference system may represent the vertical velocity of said aircraft, said differentiation means delivering the first order derivative of said altitude measurements and said integration means undertaking the first order integration of said polled signal.

However, especially for use in an automatic landing system, it is often preferable for said signal delivered by said inertial reference system to represent the vertical acceleration of said aircraft, for said differentiation means to deliver the second order derivative of said altitude measurements and for said integration means to undertake the second order integration of said polled signal.

Preferably, for the safety reasons given above, the device according to the present invention includes an auxiliary poller receiving a plurality of signals representing said derivative of the altitude of the aircraft and formulating said signal representing said derivative and forwarded to said poller with at least three inputs.

In order to eliminate the high-frequency noise contaminating the radio altimeter measurements, there is provided, between each of said differentiation means and the corresponding input of the poller, a filter for the high frequencies. Although this filter may have any appropriate transfer function F(p), it is advantageous for it to be of second order, for example of the type:

$$F(p) = \frac{K2}{K2 + K1 \cdot p + p^2}$$

an expression in which p is the LAPLACE variable, K1 and K2 being constant gains.

Moreover, in order to compensate for the phase shift introduced by said filters for high frequencies, it is advantageous to provide, between the output of each of said filters for high frequencies and the output of said inertial reference system delivering said signal representing an altitude derivative, a phase shift compensation filter with a transfer function equal to $1-F(p)$.

In a practical embodiment, it is advantageous for each assembly, associated with a radio altimeter and including said differentiation means, the filter for high frequencies and the phase shift compensation filter, to be formed by a complex filter receiving one of said altitude measurements delivered by the corresponding radio altimeter and said signal representing a derivative of the altitude and delivered by said inertial reference system.

In the case, mentioned above, where a vertical acceleration signal $\ddot{Z}i$ is directed from said inertial reference system and where there is provision for second order differentiation $\ddot{Z}j$ of the j radio altimeter altitude measurements $Zj$, it is advantageous for each of said complex filters to deliver, at its output, the filtered second order derivative $\ddot{Z}jf$ such that:

$$\ddot{Z}jf = p^2 \cdot F(p) \cdot Zj + [1 - F(p)]\ddot{Z}i$$

BRIEF DESCRIPTION OF THE DRAWINGS

The attached figures will aid in understanding how the invention may be implemented. In these figures, identical labels denote similar elements.

DESCRIPTION OF THE PREFERRED EMBODIMENTS

The example embodiments, according to the present invention, and shown by FIGS. 1A, 1B, 2A, 2B and 2C, are intended to be mounted on board an airplane (not represented) and they include two radio altimeters RA1 and RA2, an inertial reference system IRS, a poller V with three inputs and a terminal S on which an altitude estimation $\hat{Z}$ appears. The two radio altimeters RA1 and RA2 deliver, at their outputs, their respective measurements Z1 and Z2 of the altitude of said airplane.

For all useful purposes, it is recalled that pollers are devices, hardware and/or software, which, on receiving a plurality (generally at least equal to three) of independent input signals, emanating from subsystems used redundantly, signals representing the same magnitude, deliver to their output an output signal resulting from a specific poll. For example, in the case of three input signals:
  the poll is by majority and the output signal is the value of two identical input signals; or
  the poll relates to the median and the output signal consists of the input signal which is flanked by the other two; or
  the poll is adaptive, the input signal which is most distant with respect to the other two being rejected and the output signal being the mean of the two remaining input signals; and so on.

The task of a three-input poller is to provide, at its output, a correct signal from three input signals, that is to say to make allowance for the defectiveness of one of these three input signals.

Figure 1A:
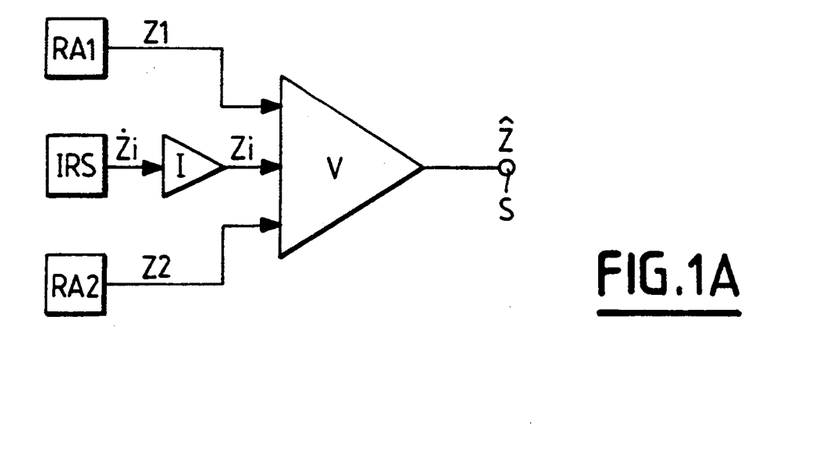
FIGS. 1A and 1B illustrate diagrammatically embodiments of the present invention in which use is made of the vertical velocity of the aircraft, diverted from the inertial reference system.
Figure 1B:
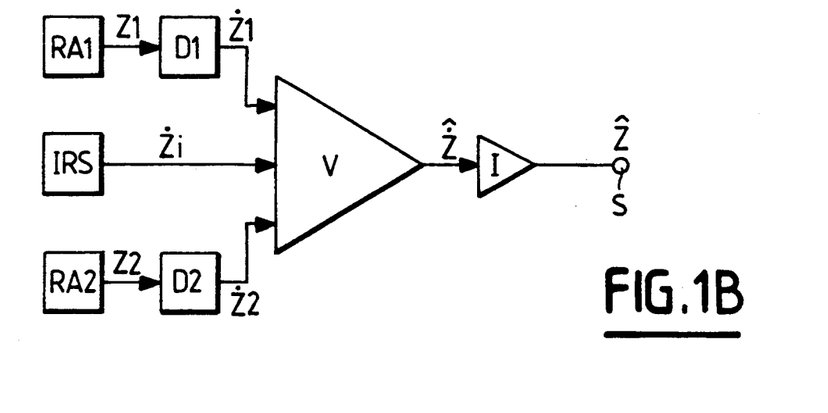

In the embodiments of FIGS. 1A and 1B, a vertical velocity inertial signal $\dot{Z}i$ is diverted from the inertial reference system IRS.

The embodiment of FIG. 1A includes an integrator I arranged at the output of the inertial reference system IRS and which transforms the vertical velocity inertial signal $\dot{Z}i$ into an altitude inertial signal Zi. The poller V receives on its three inputs, respectively, the altitude signals Z1, Z2 and Zi and it, therefore, delivers on the terminal S, connected to its output, the polled signal $\hat{Z}$ constituting an estimation of the altitude of the airplane.

In the embodiment of FIG. 1B, differentiators D1 and D2 are arranged respectively at the output of the radio altimeters RA1 and RA2 and the integrator I is arranged between the output of said poller V and the terminal S. Thus, to the inputs of the poller V are applied, respectively the first order derivatives $\dot{Z}1$ and $\dot{Z}2$ of the altitude measurements Z1 and Z2, as well as the inertial vertical velocity $\dot{Z}i$. The poller V, therefore delivers at its output a polled signal $\hat{\dot{Z}}$, representing an estimation of the vertical velocity of the airplane. The latter signal is integrated by the integrator I, so that, at the terminal S, there appears the integrated signal $\hat{Z}$ constituting an estimation of the altitude of the airplane.

Figure 2A:
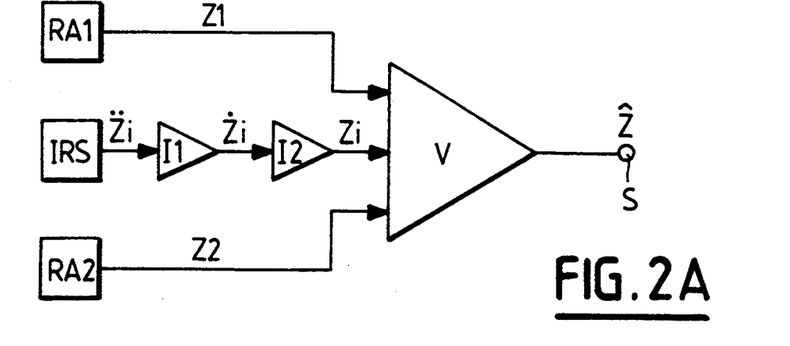
FIGS. 2A, 2B and 2C show diagrammatically example embodiments of the present invention using the measurement of vertical acceleration of the aircraft, delivered by the inertial reference system.
Figure 2B:
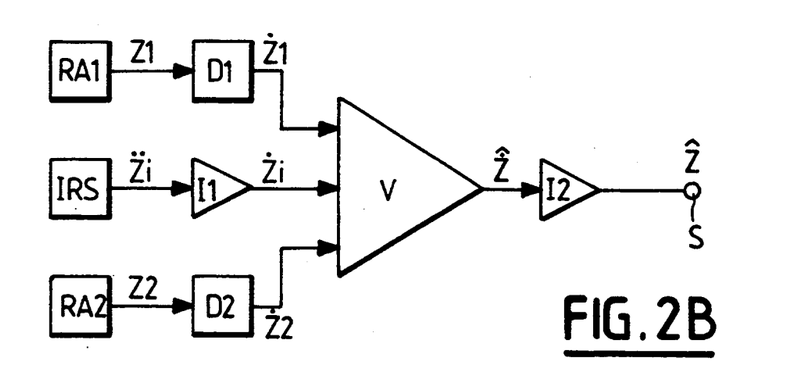
Figure 2C:
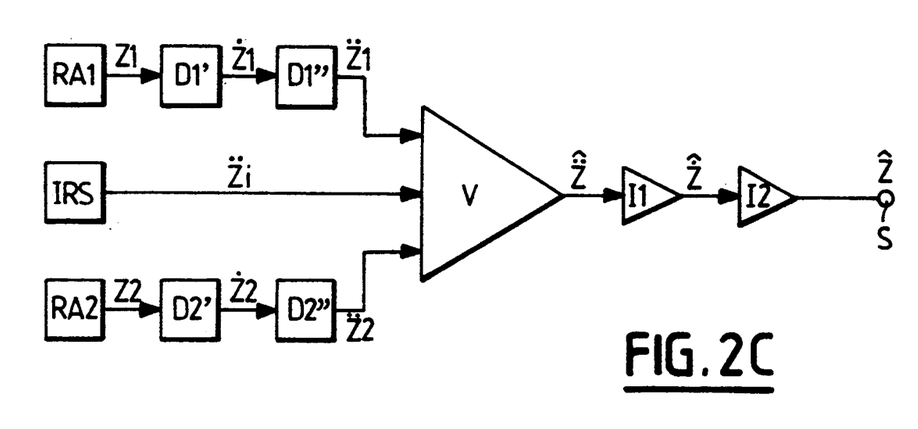

On the other hand, in the embodiments of FIG. 2A, 2B and 2C, a vertical acceleration inertial signal $\ddot{Z}i$ is directed from the inertial reference system IRS.

The embodiment of FIG. 2A includes two integrators I1 and I2, mounted in series between the inertial reference system IRS and the corresponding input of the poller V, the other two inputs of the latter being connected, respectively, to the outputs of the radio altimeters RA1 and RA2. Accordingly, the inputs of said poller V, respectively, receive the altitude measurements Z1 and Z2, as well as the altitude inertial signal Zi. The poller V, therefore, forwards the estimation of the altitude $\hat{Z}$ to the terminal S.

In the embodiment of FIG. 2B, differentiators D1 and D2 are arranged, respectively, at the output of the radio altimeters RA1 and RA2, a first integrator I1 is arranged between the inertial reference system IRS and the poller V and a second integrator I2 is arranged between the output of the poller V and the terminal S. The differentiators D1 and D2, therefore, forward, respectively, to the poller V the first order derivatives $\dot{Z}1$ and $\dot{Z}2$ of the altitude measurements $\dot{Z}1$ and $\dot{Z}2$, while the first integrator I1 forwards to the poller V the inertial vertical velocity signal $\dot{Z}i$. The poller V, therefore, delivers at its output the vertical velocity estimation signal $\hat{\dot{Z}}$ which, integrated by the second integrator I2, furnishes the altitude estimation $\hat{Z}$ present on the terminal S.

Finally, in the embodiment of FIG. 2C:
  two differentiators D1' and D1" are mounted in series between the radio altimeter RA1 and the corresponding input of the poller V;
  two differentiators D2' and D2" are mounted in series between the radio altimeter RA2 and the corresponding input of the poller V; and
  two integrators I1 and I2 are mounted in series between the output of the poller V and the terminal S.

The result of this is that the three inputs of the poller V receive, respectively, the second order derivatives $\ddot{Z}1$ and $\ddot{Z}2$ of the altitude measurements Z1 and Z2 and the vertical acceleration inertial signal $\ddot{Z}i$. It, therefore, delivers, at its output, a vertical acceleration estimation signal $\hat{\ddot{Z}}$ which, integrated by the successive integrators I1 and I2, furnishes the terminal S with the altitude estimation $\hat{Z}$.

Figure 3:
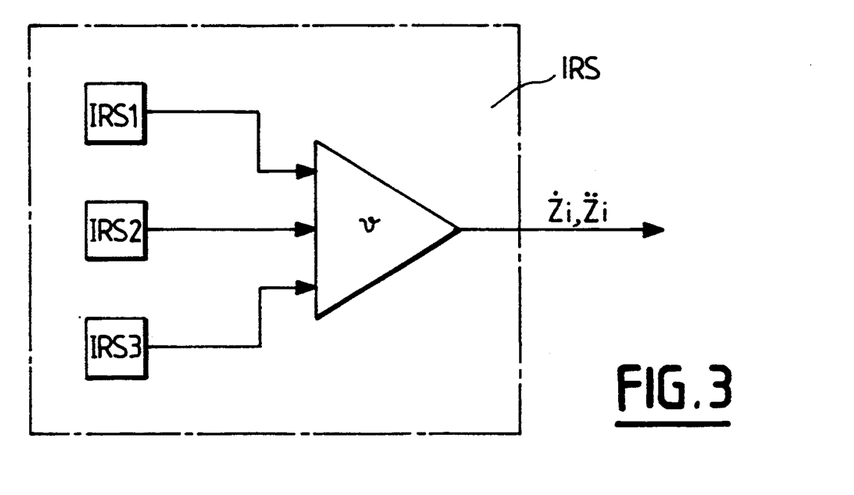
FIG. 3 illustrates the formulation by polling of the inertial signal of vertical velocity or vertical acceleration in the case where there is more than one inertial reference system.

As FIG. 3 shows, for safety purposes, the inertial signals used, namely, $\dot{Z}i$ for the embodiments of FIGS. 1A and 1B and $\ddot{Z}i$ for the embodiments of FIGS. 2A, 2B and 2C, may originate not from a single inertial reference system, but from a plurality of such systems. In this figure may be seen an example of an IRS system composed of three independent inertial reference systems IRS1, IRS2 and IRS3, associated with an auxiliary poller v. The auxiliary poller (v) receives a plurality of signals representing the derivative of the altitude of the aircraft and formulates the signals (Zi or Żi) representing the derivative of the altitude. Thus, the device according to the invention is protected against faults in the inertial reference systems.

It is seen, therefore, that, in the devices according to the invention and described above, there are used:
- two independent radio altimeter altitude signals Z1 and Z2, originating from the two independent radio altimeters RA1 and RA2; and
- a vertical velocity or vertical acceleration inertial signal available on board the airplane for other uses.

The result of this is that it is possible, by virtue of the invention, with the aid of just two radio altimeter measurement chains, to obtain straightforwardly the advantages of the devices with three radio altimeter measurement chains.

It will be observed that, by design, the two radio altimeters RA1 and RA2 may not furnish two absolutely identical measurements Z1 and Z2, but on the contrary deliver two measurements Z1 and Z2 which are offset by a constant a, for example, such that $Z2 = Z1 + a$. It is therefore advantageous to this end to employ the embodiments of FIGS. 1B, 2B and 2C which, since they involve a differentiation of Z1 and Z2, eliminate the constant offset a between the measurements Z1 and Z2.

It will be understood that, for the opposite reason, prudence should be exercised when employing the embodiments of FIGS. 1A, 2A and 2B which involve integration of the inertial signal Żi or Z̈i, this introducing an integration constant which risks distancing, at the input of the poller V, the magnitude Zi or Żi of inertial origin from the magnitudes Z1 Z2 or Ż1, Ż2 of radio altimeter origin.

For these reasons, the most advantageous embodiments of the device according to the present invention are those shown diagrammatically by FIGS. 1B and 2C.

Furthermore, it is known that, in known inertial reference systems, measurement of the vertical velocity Żi is generally baro-inertial, while measurement of the vertical acceleration Z̈i is purely inertial. Also, near the ground, there is a risk of the measurement of the vertical velocity Żi being disturbed, while the measurement of the vertical acceleration Z̈i is not influenced by the nearness of the ground. Accordingly, especially for use in an automatic landing system, the preferred embodiment of the invention is that shown diagrammatically by FIG. 2C.

Figure 4:
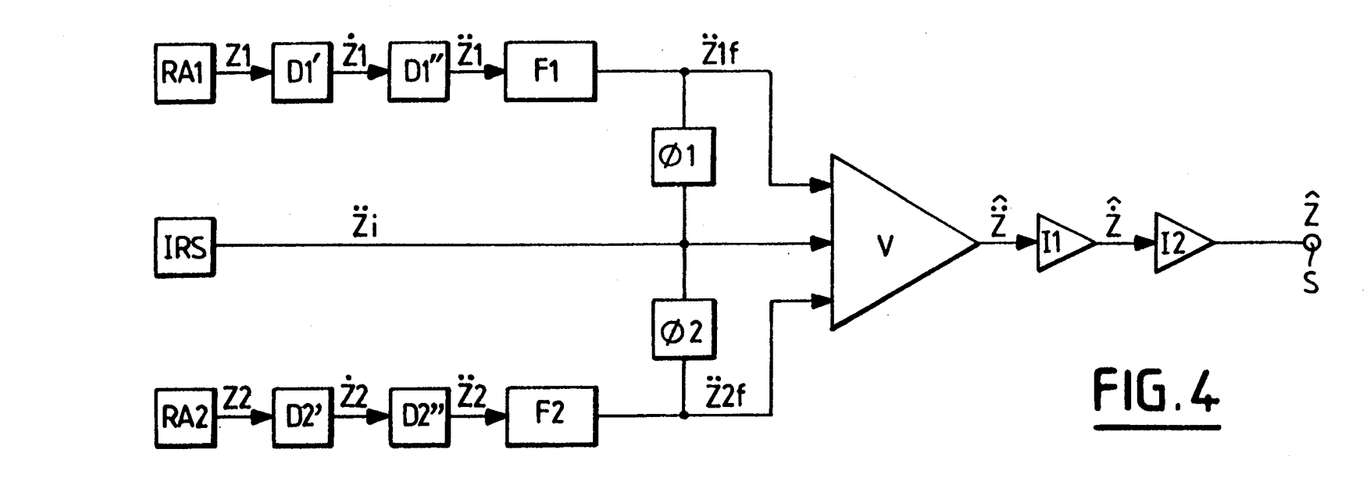
FIG. 4 illustrates the practical block diagram, with high frequency filtering, of the device of FIG. 2C.

In fact, the devices whose block diagrams are shown by the figures, and especially that of FIG. 2C, are usable as such only if all the input signals Z1, Z2 Żi and Z̈i are free from noise. This is not generally the case, the measurements Z1 and Z2 including high-frequency noise which must be eliminated. To do this, as shown in FIG. 4 for the particular device of FIG. 2C, filters F1 and F2 are provided, arranged, respectively, in this case between the output of the differentiators D1″ and D2″, on the one hand, and the poller V, on the other hand Thus, the poller V receives the filtered second order derivatives Z̈1f and Z̈2f, instead of the signals Z̈1 and Z̈2 as in the diagram of FIG. 2C.

In a known manner, the high-frequency filters F1 and F2 introduce a phase shift of the filtered signal, so that phase shift compensation filters $\phi 1$ and $\phi 2$ are provided and take as phase reference the second order inertial derivative Z̈i delivered by the inertial reference system or systems IRS (preferably systems).

Accordingly, the phase shift compensation filters $\phi 1$ and $\phi 2$ are arranged, respectively, between the output of the IRS system, on the one hand, and the output of the corresponding filter F1 or F2, on the other hand.

If the transfer function of the filters F1 and F2 is denoted by F(p), p being the LAPLACE variable, the transfer function of each of the compensating filters $\phi 1$ and $\phi 2$ is equal to $1 - F(p)$. Accordingly, we may write:

$$\ddot{Z}1f = F(p) \cdot \ddot{Z}1 + [1 - F(p)]\ddot{Z}i \qquad (1)$$

$$\ddot{Z}2f = F(p) \cdot \ddot{Z}2 + [1 - F(p)]\ddot{Z}i \qquad (2)$$

The transfer function F(p) can be of any form or of any order suitable for effective filtering of the high-frequency noise contaminating the altitude measurements Z1 and Z2. It may, for example, be first order. Nevertheless, preferably, it is chosen to be second order, of the type $$F(p) = \frac{K2}{K2 + K1 \cdot p + p^2} \qquad (3)$$

K1 and K2 being constant gains.

Since, by way of the differentiators D1′ D1″ and D2′, D2″, the altitude measurements Z1 and Z2, respectively, are differentiated twice, we may write:

$$\ddot{Z}1 = p^2 \cdot Z1 \text{ and} \qquad (4)$$

$$\ddot{Z}2 = p^2 \cdot Z2 \qquad (5)$$

so that the expressions (1) and (2) become respectively, $$\ddot{Z}1f = p^2 \cdot F(p) \cdot Z1 + [1 - F(p)]\ddot{Z}i \text{ and} \qquad (6)$$

$$\ddot{Z}2f = p^2 \cdot F(p) \cdot Z2 + [1 - F(p)]\ddot{Z}i \qquad (7)$$

Equation (6) shows that the assembly of differentiators D1′ and D1″ and of filters F1 and $\phi 1$ can be replaced by a filter FD1 (see FIG. 5) receiving the altitude measurement Z1 and the inertial vertical acceleration Z̈i and satisfying equation (6). Similarly, equation (7) shows that the assembly of differentiators D2′ and D2″ and filters F2 and $\phi 2$ can be replaced by a filter FD2 (FIG. 5) receiving the altitude measurement Z2 and the inertial vertical acceleration Z̈i and satisfying equation (7).

Figure 5:
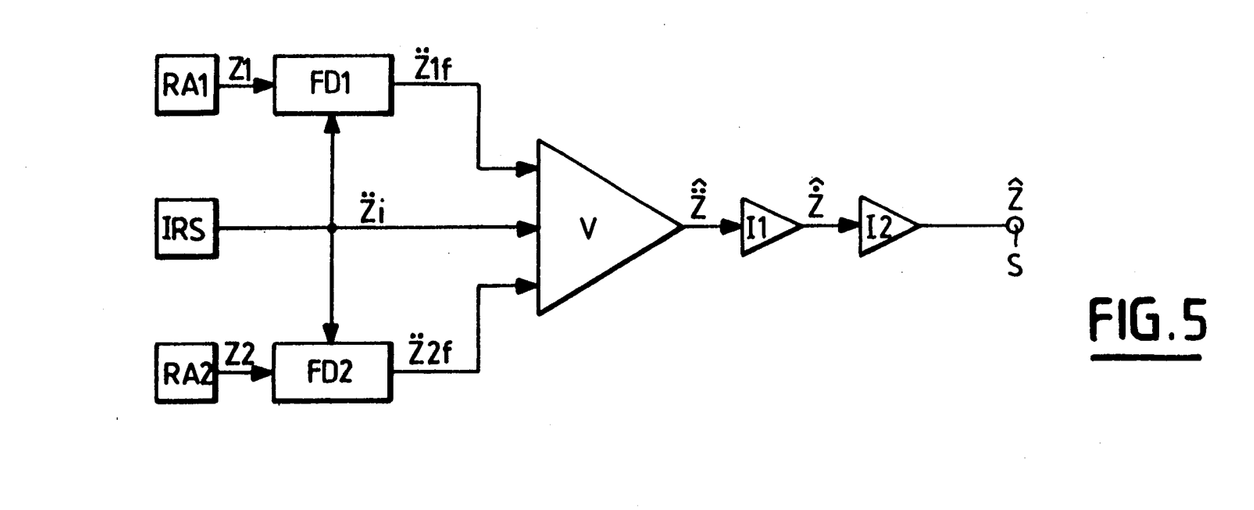
FIG. 5 shows a particular embodiment of the device of FIG. 4.

In the case where F(p) is equal to expression (3), we may therefore write:

$$\ddot{Z}1f = \frac{K2 \cdot p^2}{K2 + K1 \cdot p + p^2} \cdot Z1 + \frac{(K1 + p)p}{K2 + K1 \cdot p + p^2} \cdot \ddot{Z}i \qquad (8)$$

and $$\ddot{Z}2f = \frac{K2 \cdot p^2}{K2 + K1 \cdot p + p^2} \cdot Z2 + \frac{(K1 + p)p}{K2 + K1 \cdot p + p^2} \cdot \ddot{Z}i \qquad (9)$$

Taking into account the fact that:

$1/p \ \ddot{Z}1f = \dot{Z}1f$ and $$1/p\, \ddot{Z}2f = \dot{Z}2f$$

$$1/p^2\, \ddot{Z}1f = Z1f \text{ and}$$

$$1/p^2\, \ddot{Z}2f = Z2f$$

calling $\dot{Z}1f$ and $\dot{Z}2f$ the first order integral of $\ddot{Z}1f$ and of $\ddot{Z}2f$ constituting the output $\hat{\dot{Z}}$ of the integrator I1 and Z1f and Z2f the second order integral of $\ddot{Z}1f$ and of $\ddot{Z}2f$ constituting the output of the integrator I2, when the poller V is passing for the measurement of the radio altimeter RA1 or for that of radio altimeter RA2, respectively, we may write equations (8) and (9) respectively, in the forms $$\ddot{Z}1f = \ddot{Z}i + K1\,(1/p\,\ddot{Z}i - \dot{Z}1f) + K2\,(Z1 - Z1f) \qquad (10)$$

and $$\ddot{Z}2f = \ddot{Z}i + K1\,(1/p\,\ddot{Z}i - \dot{Z}2f) + K2\,(Z2 - Z2f) \qquad (11)$$

Figure 6:
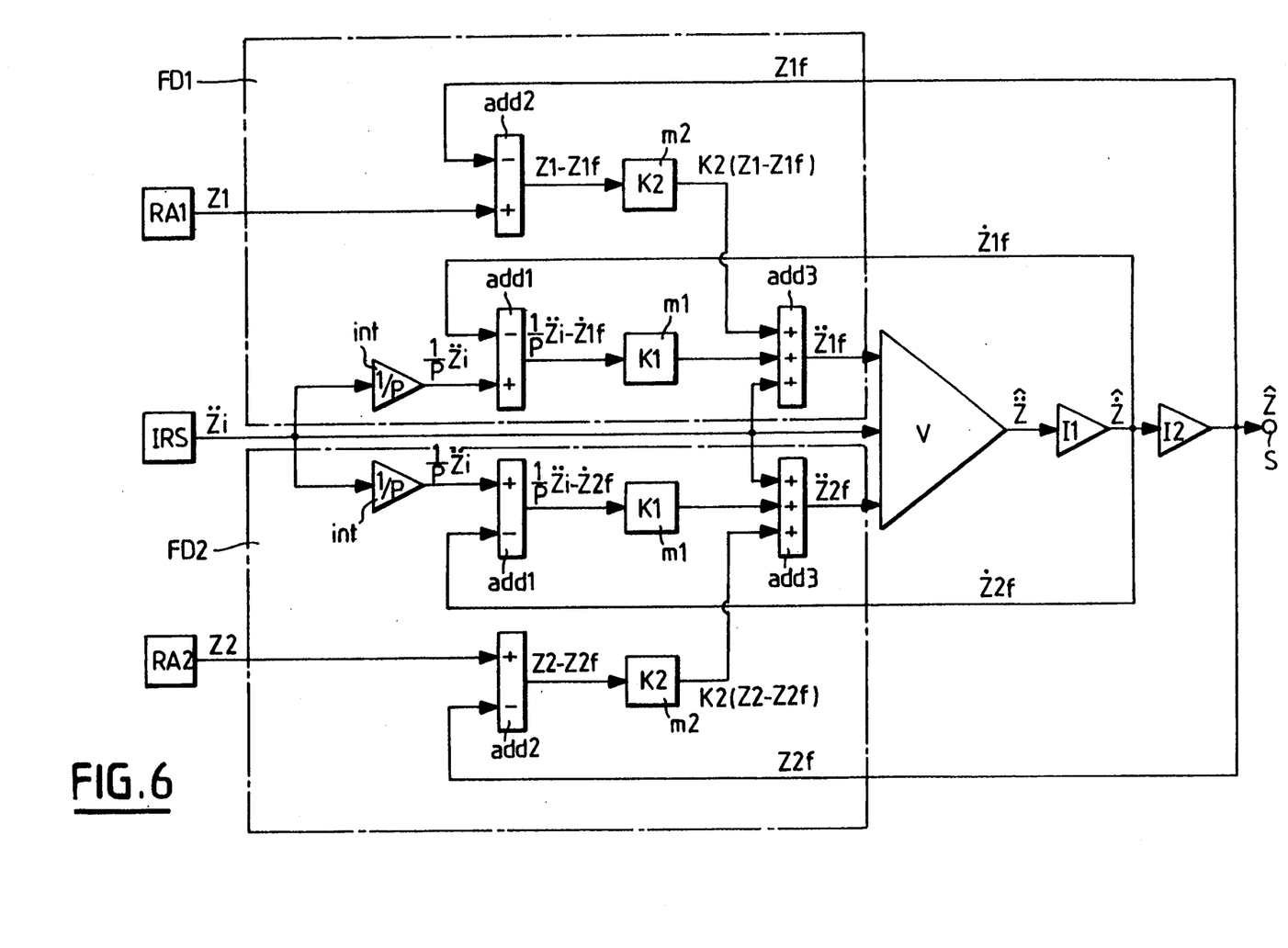
FIG. 6 shows a practical embodiment of the device of FIG. 5, for a particular transfer function of the high frequency filter.

Represented in FIG. 6 is an example embodiment of the filters FD1 and FD2 which are capable of satisfying equations (10) and (11).

In order to understand the block diagram of FIG. 6, it must be borne in mind (as already indicated above) that the poller V is then of the type in which the vertical acceleration estimation $\hat{\ddot{Z}}$ at its output is formed either by $\ddot{Z}1f$, or by $\ddot{Z}2f$, or else by $\ddot{Z}i$, depending on the instantaneous values of these three magnitudes.

Thus, when the vertical acceleration estimation $\hat{\ddot{Z}}$ is formed by $\ddot{Z}1f$ (or $\ddot{Z}2f$), everything occurs as if the poller V were setting up a short circuit between the branch of the circuit RA1, D1', D1'', F1 (or the circuit branch RA2, D2', D2'', F2) and the circuit branch I1, I2, S.

Moreover, the result of this is that, depending on the case, the estimation of the vertical velocity $\hat{\dot{Z}}$ and the altitude estimation $\hat{Z}$ are formed, respectively, by the first order integral ($\dot{Z}1f$, $\dot{Z}2f$ and $\dot{Z}i$) and by the second order integral (Z1f, Z2f and Zi), either of $\ddot{Z}1f$, or of $\ddot{Z}2f$, or else of $\ddot{Z}i$.

As can be seen in FIG. 6, each complex filter FD1 or FD2 includes, for example, two adders-subtractors add1 and add2, an adder add3, two multipliers m1 and m2 with respective gains K1 and K2 and an integrator int.

In the case where the poller V is passing for the radio altimeter RA1, the filter FD1 is active and it operates as follows:

- its integrator int, which receives the vertical acceleration $\ddot{Z}i$ of the IRS system, integrates this acceleration and delivers at its output the first order integral $1/p\,\ddot{Z}i$;
- its adder-subtractor add1 receives the integral $1/p\,\ddot{Z}i$ on its positive input and the vertical velocity estimation $\hat{\dot{Z}}$ on its negative input. Thus, as $\hat{\dot{Z}}$ is formed by $\dot{Z}1f$, the output of the adder-subtractor add1 delivers the quantity $1/p\,\ddot{Z}i - \dot{Z}1f$;
- its multiplier m1 multiplies the latter quantity by the gain K1, so that it forms the quantity $K1(1/p\,\ddot{Z}i - \dot{Z}1f)$ which corresponds to the intermediate term of equation (10) and which is forwarded to one of the addition inputs of the adder add3;
- its adder-subtractor add2 receives the altitude measurement Z1 from the radio altimeter RA1 on its positive input and the altitude estimation $\hat{Z}$ on its negative input. Thus, as $\hat{Z}$ is formed by Z1f, the output from the adder-subtractor add2 delivers the quantity $Z1 - Z1f$;
- its multiplier m2 multiplies the latter quantity by the gain K2, so that it forms the quantity $K2(Z1 - Z1f)$, which corresponds to the last term of equation (10), and which is forwarded to one of the addition inputs of the adder add3;
- moreover, the adder add3 receives the vertical acceleration $\ddot{Z}i$ on a third addition input [first term of equation (10)].

The result of this is that the output of the adder add3 delivers to the poller V the signal $\ddot{Z}1f$ given by equation 10.

Of course, when the poller V is passing for the radio altimeter RA2, in a similar manner, the adder add3 of the filter FD2 delivers to the poller V the signal $\ddot{Z}2f$ given by equation (11).

By examining the complex filters FD1 and FD2 of FIG. 6, it may be noted that the inertial vertical acceleration signal $\ddot{Z}i$ is used three times, namely:

- by way of reference at the input of the poller V;
- for adjustment, by the correcting loops emanating from the radio navigation probes, to the level of the adders add3;
- for integration, by way of filter, at the input of the adders-subtractors add1.

From the foregoing it is therefore readily understood that the devices according to the invention can use just two radio altimeters while exhibiting a passivity which is equal to, or even greater than, that of the devices with three radio altimeters.

Furthermore, these devices allow a lowering of the decision height thresholds by virtue of better passivity, that is to say:

- transparency to the first fault;
- better passivity to the second fault.

Zero phase-shift variable filtering of the radio navigation information enables the automatic landing performance of the aircraft to be improved.

Information output by the means for computing the second order integral I1 and I2 is used later in a conventional manner by the remainder of the circuits (not represented) of an automatic aircraft landing system including such an altitude estimation device, for controlling the path of the latter in a conventional manner.

Furthermore, it will be noted that, prior to the filtering by the filter F1 (or F2), the measurement Z1 (or Z2) undergoes second order differentiation by the action of the differentiators D1' and D1'' (or D2' and D2''), which, according to the LAPLACE transformation, can be written $\ddot{Z}1 = p \cdot p \cdot Z1 = p^2 \cdot Z1$ (or $\ddot{Z}2 = p^2 \cdot Z2$), while, subsequent to polling, the vertical acceleration estimation $\hat{\ddot{Z}}$ undergoes double integration by the action of the integrators I1 and I2, which may be written $\hat{Z} = 1/p^2 \cdot \hat{\ddot{Z}}$.

Accordingly, when the poller V allows through $\ddot{Z}1f$ to form $\hat{\ddot{Z}}$, the transfer function between $\hat{Z}$ and Z1 can be written:

$$\hat{Z} = Z1f = \frac{K2}{K2 + K1 \cdot p + p^2} \cdot Z1 + \frac{(K1 + p)}{p(K2 + K1 \cdot p + p^2)} \cdot \ddot{Z}i \qquad (12)$$

and

Similarly, when the poller V is passing for $\ddot{Z}2f$, we have $$\hat{Z} = Z2f = \frac{K2}{K2 + K1 \cdot p + p^2} \cdot Z2 + \frac{(K1 + p)}{p(K2 + K1 \cdot p + p^2)} \cdot \dot{Z}_i \quad (13)$$

What is claimed is:

1. A device for determining an estimation ($\hat{Z}$) of the altitude of an aircraft, said aircraft including an inertial reference system (IRS), said device being carried on board said aircraft and said device comprising:
   (a) at least two radio altimeters (RA1, RA2), each radio altimeter delivering a measurement (Z1, Z2) of the altitude of said aircraft;
   (b) a poller (V) with at least three inputs wherein one of the inputs of said poller (V) is connected to the output of said inertial reference system (IRS) delivering a signal ($\dot{Z}_i$, $\ddot{Z}_i$) representing a first order derivative or a second order derivative of the altitude;
   (c) the other inputs of said poller (V) are connected, respectively, to the outputs of said radio altimeters (RA1, RA2) delivering said altitude measurements (Z1, Z2) through differentiation means (D1, D2−D1', D1'', D2', D2'') delivering the derivative ($\dot{Z}1$, $\dot{Z}2$−$\ddot{Z}1$, $\ddot{Z}2$) of said altitude measurements, these latter derivatives being of the same order as said altitude derivative ($\dot{Z}_i$, $\ddot{Z}_i$) represented by said signal originating from said inertial reference system; and
   (d) the output of said poller is connected to integration means (I−I1, I2) integrating the polled signal ($\hat{\dot{Z}}$, $\hat{\ddot{Z}}$) appearing at the output of said poller, so that the output of said integration means delivers an estimated altitude signal ($\hat{Z}$).

2. The device as claimed in claim 1, wherein said signal delivered by said inertial reference system (IRS) represents the vertical velocity ($\dot{Z}_i$) of said aircraft, wherein said differentiation means (D1, D2) delivers the first order derivative ($\dot{Z}1$, $\dot{Z}2$) of said altitude measurements (Z1, Z2), and wherein said integration means (I) undertakes the first order integration of said polled signal ($\hat{\dot{Z}}$).

3. The device as claimed in claim 1, wherein said signal delivered by said inertial reference system (IRS) represents the vertical acceleration ($\ddot{Z}_i$) of said aircraft, wherein said differentiation means (D1', D1''−D2', D2'') delivers the second order derivative $\ddot{Z}1$, $\ddot{Z}2$) of said altitude measurements, and wherein said integration means (I1, I2) undertakes the second order integration of said polled signal.

4. The device as claimed in claim 1, wherein, between each of said differentiation means (D1,D2−D1',D1'',D2',D2'') and the corresponding input of the poller, is arranged a filter (F1 or F2) for the high frequencies.

5. The device as claimed in claim 4, wherein, between the output of each of said filters for high frequencies (F1,F2) and the output of said inertial reference system (IRS) delivering said signal representing an altitude derivative, is mounted a phase shift compensation filter ($\phi 1$ or $\phi 2$) with a transfer function equal to $1 - F(p)$.

6. The device as claimed in claim 4, wherein the transfer function F(p) of said filters for high frequencies (F1 and F2) is equal to:

$$F(p) = \frac{K2}{K2 + K1 \cdot p + p^2}$$

an expression in which p is a LAPLACE variable, and K1 and K2 are constant gains.

7. The device as claimed in claim 1, further comprising: an auxiliary poller (v) which receives a plurality of signals representing said derivative of the altitude of the aircraft and which formulates said signals ($\dot{Z}_i$ or $\ddot{Z}_i$) representing said derivative of said altitude.

8. The device as claimed in claim 1, wherein each assembly of differentiators D1', D1'' and a filter F1 and a filter $\phi 1$ or differentiators D2', D2'', and a filter F2 and a filter $\phi 2$, associated with a radio altimeter and including said differentiation means, the filter for high frequencies and the phase shift compensation filter, forms a complex filter (FD1 or FD2, respectively) receiving one of said altitude measurements (Zj) delivered by the corresponding radio altimeter and said signal representing a derivative of the altitude and delivered by said inertial reference system.

9. The device as claimed in claim 8, in which a vertical acceleration signal ($\ddot{Z}_i$) is directed from said inertial reference system, and in which second order differentiation means are provided in order to form the second order derivatives ($\ddot{Z}j$) of j altitude measurements ($\ddot{Z}j$), and wherein each of said complex filters (FD1, FD2) delivers, at its output, the filtered second order derivative ($\ddot{Z}jf$) such that $$\ddot{Z}jf = p^2 \cdot F(p) \cdot Zj + [1 - F(p)] \ddot{Z}_i.$$

* * * * *